Aug. 19, 1958 — G. E. ARMINGTON — 2,848,275
FRAMELESS SIDE DUMP TRAILER
Filed July 15, 1954 — 4 Sheets-Sheet 1
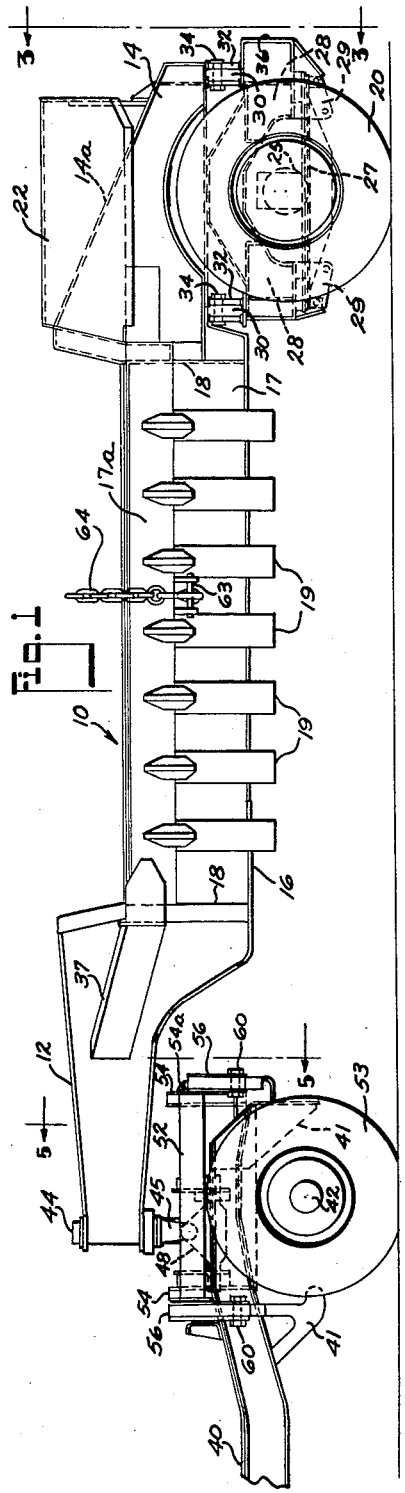
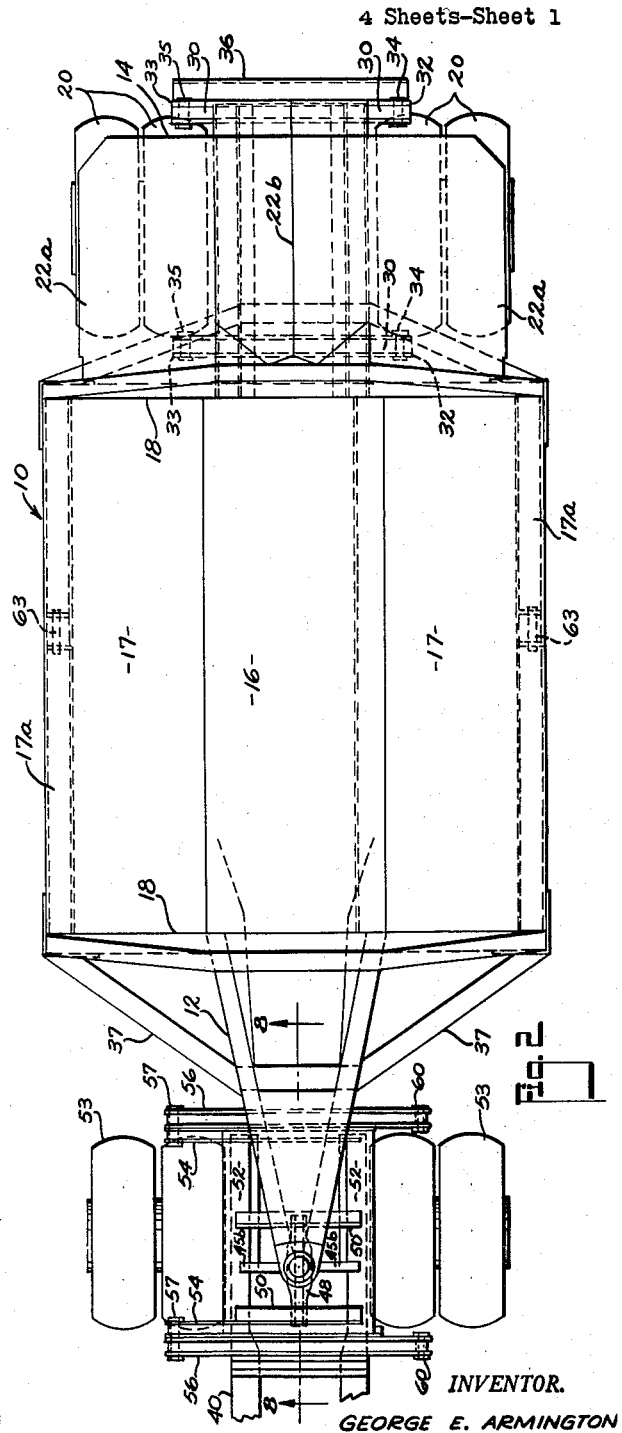
INVENTOR.
GEORGE E. ARMINGTON
BY
ATTORNEYS

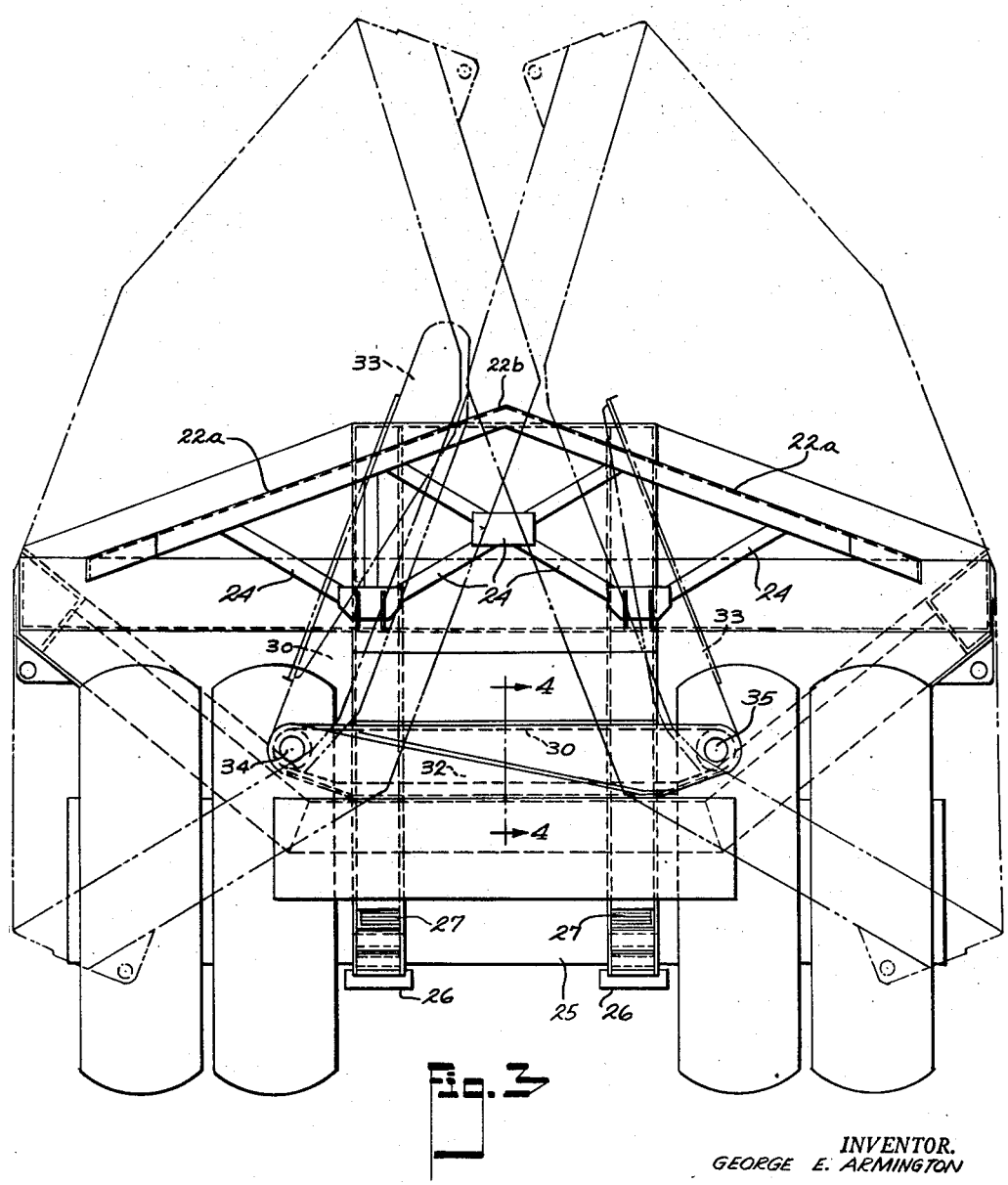

Aug. 19, 1958 G. E. ARMINGTON 2,848,275
FRAMELESS SIDE DUMP TRAILER
Filed July 15, 1954 4 Sheets-Sheet 3
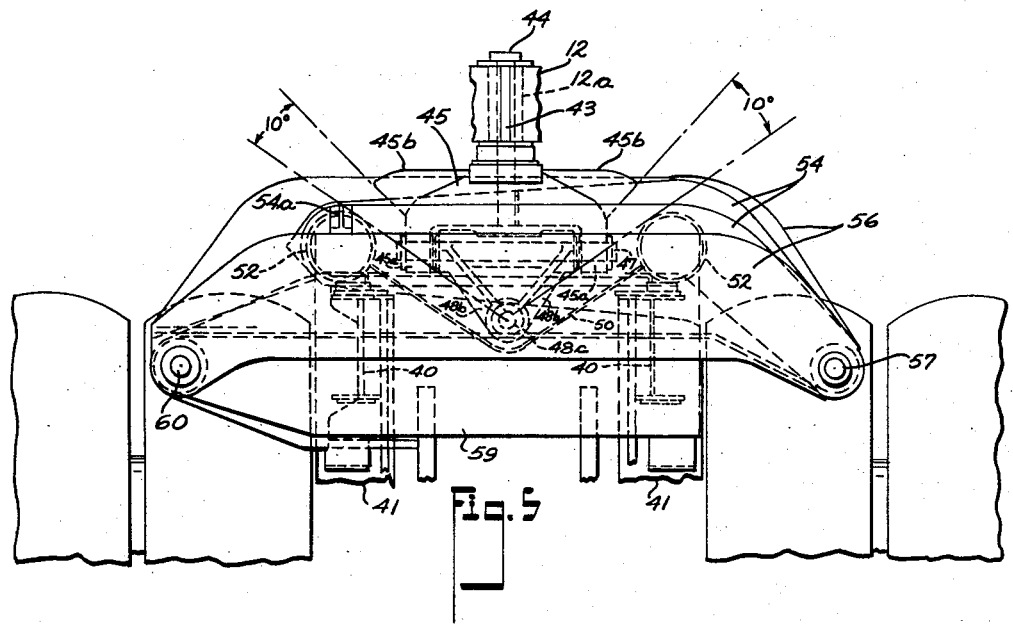
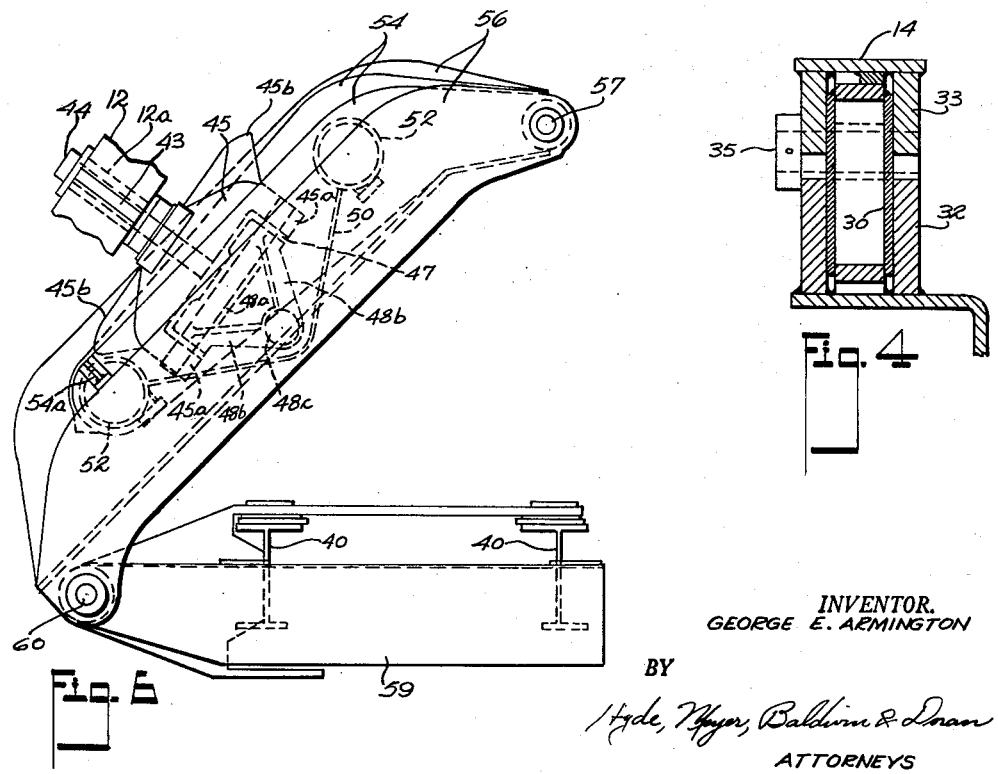
INVENTOR.
GEORGE E. ARMINGTON
BY
Hyde, Meyer, Baldwin & Doan
ATTORNEYS

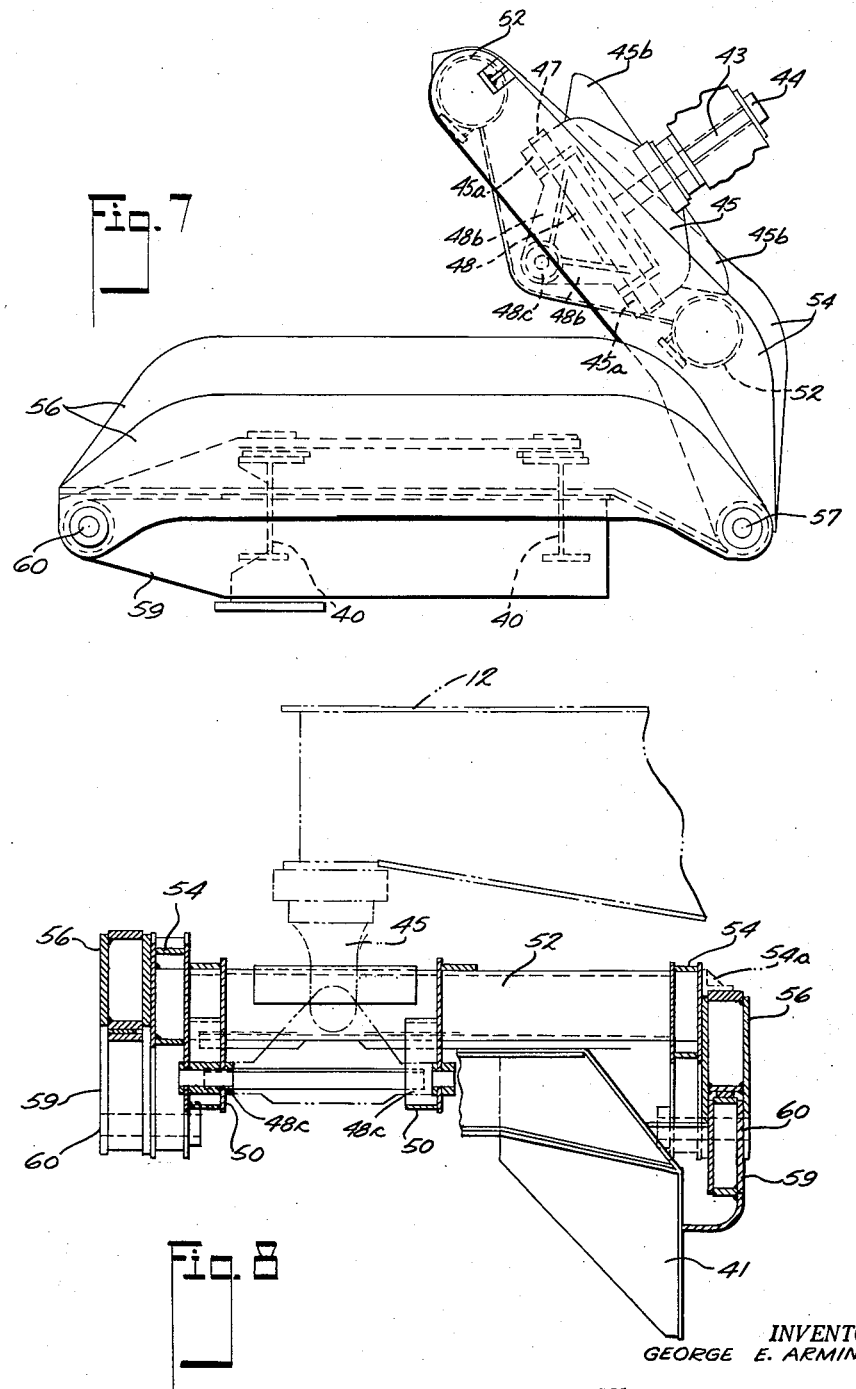

United States Patent Office 2,848,275
Patented Aug. 19, 1958

2,848,275

FRAMELESS SIDE DUMP TRAILER

George E. Armington, South Euclid, Ohio, assignor to General Motors Corporation, Detroit, Mich., a corporation of Delaware Application July 15, 1954, Serial No. 443,472

11 Claims. (Cl. 298—18)

This invention relates to large heavy duty dumping vehicles and more particularly to a frameless dump trailer.

An object of this invention is to provide a frameless trailer having its ends pivotally mounted for tilting the load-carrying body laterally to the left or right.

Another object of this invention is to provide a frameless trailer having improved linkage mechanism to facilitate the dumping operation.

A further object of the invention is to provide hitch means directly between a trailer and its forward truck support, with proper provisions to accommodate all movements of the trailer which may occur in off-the-highway hauling duty, without placing undue strain on the truck or the trailer.

Still another object of this invention is to provide a heavy duty frameless trailer having its dead weight substantially reduced so that more of a load can be handled.

A further object is to provide a heavy duty frameless trailer strong enough to withstand heavy impacts which are received during the loading of large pieces of material.

Another object of the present invention is to provide a frameless trailer characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

In the drawings:

Fig. 1 is a side elevational view of my novel frameless trailer, showing the dumping body supported between front and rear wheel means.

Fig. 2 is a top plan view of the frameless trailer shown in Fig. 1.

Fig. 3 is a rear end elevation, enlarged, of the trailer taken along the plane of line 3—3 of Fig. 1 showing the load-carrying position of the body in full lines and both left and right lateral dumping positions in broken lines.

Fig. 4 is a sectional view of the rear connecting link taken along the plane of line 4—4 of Fig. 3.

Fig. 5 is a sectional view, enlarged, taken along the plane of line 5—5 of Fig. 1.

Fig. 6 is a sectional view similar to Fig. 5 illustrating the position of the front linkage when the body is dumped to the left.

Fig. 7 is a sectional view similar to Fig. 6 showing the front linkage position when the body is dumped to the right.

Fig. 8 is a sectional view, enlarged, taken along the plane of line 8—8 of Fig. 2.

I have discovered that by eliminating the usual heavy frame accompanying previous dumping vehicles, it becomes possible to substantially reduce the weight of the machine and at the same time increase its load carrying capacity. Off-the-road vehicles in the past have had extremely heavy framework in order to withstand the large stresses placed upon them.

My novel light weight frameless trailer consists of a dumping body of unitary structure, which provides its own frame. The body or bed 10 of Figs. 1 and 2, is of the cart type having a generally rectangular form. A drawbar 12 extends forwardly from the body 10 to which it is rigidly attached and by which the body may be hitched to a tractor or other draft appliance. The drawbar also serves the important function of connecting the body 10 with front pivotal means which will be subsequently discussed in detail. The rear of the bed is provided with an extension member 14 which is pivotally mounted on rear wheel means having a heavy duty axle and truck mounting which will hereinafter be more specifically discussed. The parts thus far described comprises the principal parts of the trailer.

More particularly the body 10 comprises a bottom wall 16 with side walls 17 extending upwardly and outwardly and end walls 18 which are shown substantially vertical but may also be slanted if desired. The body is reinforced by rigidly attached structural members 19 located on the outside walls, as indicated. The structural members 19 are made of angle irons or similar structural members and extend around and beneath the body 10 from edge to edge. The sides are further reinforced by having their upper edges 17a turned or lapped under to give additional rigidity along the longitudinal axis of said body. The body thus forms a beam between the front and rear wheel means.

The rear portion of the body is supported on rear wheels 20 by means of an extension member 14 rigidly fastened to said body. Said extension has an inclined upper surface 14a and a width slightly less than the spacing between the two innermost rear wheels. A tire protective shield 22 having laterally inclined sides 22a intersecting in an apex 22b is rigidly secured to the end wall of body 10 and supported throughout its length by a truss-like framework 24 composed of a plurality of angle irons or other suitable structural members. The shield 22 extends laterally outwardly a distance to fully protect the outermost rear wheels 20. In this manner, any falling material will be deflected by the shield before it can do damage to the wheels which are usually provided with pneumatic tires, the tires being very costly and susceptible to great damage.

The rear wheels 20 are provided with a heavy duty axle 25. The axle 25 has a pair of laterally spaced frame-retaining clamps 26 attached thereto. Longitudinally extending leaf springs 27 are secured to the axle by said clamps. Load-carrying body 28 is supported on brackets 29 which are fastened to each end of the springs and extend upwardly. Thus, a body supporting frame or truck is provided and is suitably balanced over the rear wheels 20 and axle 25.

For purposes of pivotally connecting body 10 to the rear truck, I have provided a pair of spaced relatively long arms or links 30 which are connected at their outer ends to suitable lower and upper brackets 32 and 33 respectively, which extend transversely across the rear truck. The lower brackets 32 are made from generally U-shaped channel members, having horizontal bottoms and spaced side walls. The top surface of the upper bracket 33 is rigidly secured to the bottom of extension 14. The bottom of the lower bracket 32 is rigidly secured to the rear truck. As can be best seen in Fig. 3, the upper and lower brackets are cut substantially diagonally across their side walls, this permitting the sides to abut one another along substantially the entire length of the brackets. With this construction it can be seen that even though the brackets are placed one upon the other, their total vertical height is no greater than the vertical end height of one bracket. The outermost ends of the brackets are provided with apertures which receive pivot pins 34 and 35. The pivot pins 34 and 35 extend through both ends of each link 30 each of which is positioned within the side walls of the brackets 32 and 33 as seen in Figs. 3 and 4. The links 30 have the general shape of brackets 32 and 33 and are completely enclosed within the confines of said brackets when they are in a closed position, wherein, their side walls are in an abutting position, as seen in Fig. 3, in broken lines, thereby providing protection for the links. It should be noted that the brackets 28 of the rear truck extend in a fore and aft direction a distance greater than the width of the wheels 20. In this manner, an extension is provided to the front and rear of wheels 20. The links 30, and brackets 32 and 33 are secured on the extended portions fore and aft of the rear wheels. The rearmost extension also provides a bumper 36 for pushing the trailer, should the occasion arise.

Placing the links and brackets 32 and 33 on these extended portions also allows the links to be made transversely longer, without interfering with the wheels. It further facilitates pivotal movement of the links 30 since their pivot points are somewhat laterally beyond the rigidly fastened surfaces of the brackets 32 and 33, as seen in Fig. 3.

Referring now to the rear linkage operation, it will be noted from Fig. 3 that the body is shown in its normal horizontal position by solid lines and in right and left dumping positions by broken lines.

When the body is tilted to dump laterally to the left, it is apparent that the lower brackets 32 cannot swing upwardly around the axis of pivot pins 34 since they are rigidly secured to the rear trucks. However, the links 30 pivot about the axes of the pins 34 carrying with them the upper brackets 33 and the body 10. When the body is tilted to dump to the right, as viewed in Fig. 3, both the lower brackets 32 and links 30 remain unmoved, and the upper brackets 33 pivot about the axes of pivot pins 35, carrying with them the body 10.

The drawbar 12 is reinforced by structural beam members 37 which are fastened to the lateral edges of the front end of the body 10 and extend convergingly to intercept the drawbar approximately at its mid portion.

In Fig. 1, I have shown a tractor device having a frame 40 mounted on suitable brackets 41 which are in turn attached to an axle 42. Directly upon the frame is mounted suitable hitch and pivotal means, as will presently be described. The frame and axle thus provide a suitable truck upon which to attach the drawbar 12. The drawbar 12 carries a sleeve 12a and pivot pin 43 which passes through said sleeve. The pin is held in the sleeve 12a by means of a nut or ring 44 at the upper end of the pin. The lower end of pin 43 is retained in bracket 45 which forms the upper half of a universal hitch and also serves as a mounting for the drawbar 12. Bracket 45 has a pair of transversely spaced downwardly extending arms or forked ends 45a. The arms 45a are each provided with a sleeve through which passes a horizontally positioned pivot pin 47, extending transversely of the vehicle.

A second bracket 48 comprises integrally joined horizontal sleeve 48a and longitudinally extending legs or arms 48b which diverge downwardly. The sleeve 48a is provided with openings aligned with the sleeves of bracket 45 so that the pin 47 serves to connect together the two brackets 45 and 48.

A pair of spaced transversely extending end plates 50 provide a pivotal mounting for the cylindrical shafts 48c formed at the end portions of legs 48b of bracket 48, as can be seen in Figs. 7 and 8. This provides a pivotal axis longitudinally of the vehicle. It will be noted that the universal hitch comprising brackets 45 and 48 trunnions generally about the shafts 48c between plates 50. Plates 50 are rigidly secured to a pair of longitudinally extending support members 52 which are spaced laterally a distance somewhat greater than the transverse width of the arms 45a of bracket 45 and has a length substantially the same as the diameter of front wheels 53. Corresponding ends of the support member 52 are rigidly secured to a pair of longitudinally spaced transverse inner links 54. Each link 54 is seen in Fig. 7 to have a downwardly curved end portion, which extends sidewardly beyond the frame 40. An outer link 56 is pivotally connected to each of the inner links 54 at the outer end of the link 54 by a pivot pin 57. Links 56 extend across the frame 40 adjacent and parallel to inner links 54, however, the links 56 are somewhat longer than inner links 54 and it will be seen in Figs. 6 and 7 that the links are of symmetrical design in that both of their end portions extend outwardly and downwardly. The outer ends of links 56 are pivotally connected at 60 to a support member 59 which in turn is connected to the frame 40 and extends laterally outwardly beyond the side edges of the frame 40. It will be noted that the rearmost support member 59 is fastened to the end member of frame 40 and brackets 41 and provides a supporting surface with which the undersides of the rearmost outer link 56 engages. The longitudinal spacing between outer links 56 is seen to be somewhat more than the diameter of wheels 53 in Figs. 1 and 2.

Referring now to the action of the front hitch and linkage when the body 10 is tilted to dump to either side. The universal hitch provides maximum flexibility for the front end of the body 10. The body 10 can be raised or lowered a slight amount to conform to uneven terrain by the hitch oscillating about an axis provided by transversely extending shaft 47 as a center. This is extremely important when operating over rough ground. Lateral flexibility is provided by the shafts 48c pivoting on end plates 50. This permits the body to oscillate over rough ground without disturbing the tractor vehicle. Relative turning movement between the tractor and the body is provided by the vertically disposed pivot pin 43. Such turning movement is limited only by the tractor striking the body 10 which will occur at an angle greater than 90° and somewhat less than 180°. When it is desired to tilt the body to dump to either side, use must be made of the links 54 and 56. In Fig. 5 it will be seen that bracket 45 is provided with a pair of transverse extending shoulder members 45b for the purpose of intersecting the support bars 52. The hitch connection allows a limited degree of lateral movement which is approximately 10° as shown in Fig. 5. Continued lateral tilting causes the shoulders 45b to abut the support members 52 which in turn causes one of the links to pivot about its axis, thereby allowing a maximum tilting of the body. As the body tilts to the right, the links are disposed as best seen in Fig. 7. The inner links 54 pivot about the right-hand pivots 57, while the outer links 56 remain unmoved.

As the body tilts to the left, as best seen in Fig. 6, the situation with respect to the links is somewhat different. Here, the outer links 56 swing about their pivots 60. The inner links remain in situ and move as a unit with the outer links 56. The inner links 54 are carried on the outer links by right pivotal connection 57 and an extending bracket 54a which is secured to the side wall of the inner link near its free end, and is adapted to rest upon the upper surface of the outer link, as seen in Figs. 6, 7 and 8. The bracket 54a further prevents the inner link from oscillating about pivot pin 57 when in the tilted position, shown in Fig. 6.

Inasmuch as the pivots 57 and 60 are eccentrically disposed outwardly and downwardly from the universal hitch connection and its associated drawbar, it follows that the natural force exerted upon the linkage is downward to maintain the link in a non-dumping position.

However, while the linkage normally maintains the body in a non-dumping position, it also permits the body to oscillate through the entire range of tiltling movement without interference.

The novel hitch and linkage assembly permits dumping of the body even though the tractor is disposed at a sharp angle with the body 10.

The operation of dumping the trailer body may be performed manually or through suitable power means having operative connections to raise either side of the body. This practice in employing power means for tilting the body is well known and inasmuch as such apparatus forms not part of the present invention, I have not shown the same.

For the purpose of tilting the body, I have provided a bracket 63 on the outer surface of each of the side walls of the body 10. The bracket has a center open portion for purposes of receiving a hook 64 suspended from a crane or other suitable power mechanism. A vertical thrust upon the chain and hook shown, will cause the engaged side of the body 10 to tilt upwardly, thus dumping the load to other side.

It will, of course, be understood that the front and rear link mechanisms are so disposed as to have the corresponding ends and cooperating links positioned to facilitate oscillatory movement of the body.

In view of the forgeoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible to certain changes fully comprehended by the spirit of this invention.

My frameless body might be incorporated in a self-powered vehicle, as will be readily understood.

What I claim is:

1. An off-the-road vehicle comprising a front and rear axle, each of said axles mounted on wheel means, a truck mounted on each of said axles, a frameless laterally discharging bed pivotally mounted between said trucks, and link means connected between the bed and the truck on each of said axles being movable relative to each of said trucks for directing the pivotal movement of said bed.

2. A vehicle comprising a front and rear axle, each of said axles mounted on wheel means, a truck mounted on each of said axles, a frameless laterally discharging bed pivotally mounted between said trucks, a pair of spaced links pivotally connected to each of said trucks, corresponding ends of said links being pivotally connected to second links, said bed being connected to said second link, one of said connected links controlling lateral tilting of said bed to one side, and another of said connected links controlling tilting to the opposite side.

3. A vehicle comprising a front and rear axle, each of said axles mounted on wheel means, a truck mounted on each of said axles, a frameless laterally discharging bed pivotally mounted between said trucks, a pair of longitudinally spaced links pivotally connected to each of said trucks, corresponding ends of said links being pivotally connected to second links, said bed connected to said second links, said connected links lying adjacent and parallel to one another, one of said connected links controlling lateral tilting of said bed to one side, and another of said connected links tilting to the opposite side.

4. A trailer comprising a front and rear axle, each of said axles mounted on wheel means, a truck mounted on each of said axles, each of said trucks extending fore and aft of its associated wheel means, a frameless laterally tilting body extending between said trucks, said body connected to a universal hitch at its forward end, said hitch being pivotally connected to a pair of spaced inner links, each of said inner links being pivotally connected at one end to an outer link, said outer links being pivotally connected at one end to said inner link and pivotally connected at its other end to the truck on said front axle, said inner and outer links lying substantially parallel to one another and extending transversely across said trucks, pairs of inner and outer transverse links on said rear trucks, said links pivotally connecting said rear truck and said body, corresponding ends of said front and rear truck links having cooperating pivotal positions adapted to direct tilting of said body in either lateral direction, to discharge its load.

5. A trailer comprising a front and rear axle, each of said axles mounted on wheel means, a truck mounted on each of said axles, a frameless laterally tilting body adapted to pivot between said front and rear trucks, a rigid draw bar on the front of said body and an extension on the rear of the said body, front and rear pivotal means associated between said body and said trucks, said front pivotal means comprising a connecting pin extending rotatably through said draw bar, said pin terminating in a universal hitch comprising a bracket having a pair of lateral spaced forked ends, a transverse shaft extending between said forked ends, said shaft receiving a sleeved bracket having longitudinally extending arms diverging therefrom, a pair of transversely disposed end plates, said arms pivotally engaging said plates, said plates being rigidly secured to a pair of longitudinally extending support members, said support members being spaced apart a distance slightly greater than the width of said forked bracket, shoulder means on said bracket extending laterally outwardly to abut one of said support members when said body is tilted laterally to one side or the other, corresponding ends of said support members being rigidly secured to a pair of inner links which extend transversely a distance beyond each of said support members, an outer link pivotally connected to each of said inner links at one end and pivotally connected at its other end to said front truck, said rear pivotal means comprising a pair of longitudinally spaced transversely extending link members, said link members being pivotally connected to the rear truck at one end and said body extension at the other end, corresponding ends of said inner and outer front and rear truck links having cooperating positions, whereby said body may be tilted sidewardly in either lateral direction.

6. A trailer comprising a front and rear axle, each of said axles mounted on wheel means, a truck mounted on each of said axles, each of said trucks extending fore and aft a distance greater than the width of its associated wheel means, a frameless laterally tilting body adapted to pivot between said front and rear trucks, a rigid draw bar on the front of said body and an extension on the rear of said body, front and rear pivotal means associated between said body and said trucks, said front pivotal means comprising connecting means between said draw bar and a universal hitch, said hitch comprising brackets having pairs of laterally spaced forked ends, said bracket pivotally engaging a pair of spaced plates, said plates being rigidly secured to a pair of longitudinally extending support members, said support members being secured to link means which extend transversely a distance beyond each of said support members, said link means pivotally connected to said front truck, said rear pivotal means comprising a pair of longitudinally spaced transversely extending U-shaped channel members, each of said pair of channel members comprising an upper and lower channel portion, said lower portion being rigidly fastened to said rear truck, said upper portion being rigidly fastened to said body extension, said upper and lower channels having common sides abutting along substantially their entire length, an intermediate connecting link positioned within said channels, said link being pivotally connected to the lower channel at one end and the upper channel member at the other end, corresponding ends of said front and rear truck links having cooperating pivotal positions, whereby said body may be tilted sidewardly in either lateral direction, to discharge its load.

7. A trailer comprising a front and rear axle, each of said axles mounted on wheel means, a truck mounted on each of said axles, each of said trucks extending fore and aft a distance greater than the width of its associated wheel means, a frameless laterally tilting body adapted to pivot between said front and rear trucks, a rigid draw bar on the front of said body and an extension on the rear of said body, front and rear pivotal means associated between said body and said trucks, said front pivotal means comprising a connecting pin extending rotatably through said draw bar, said pin terminating in a universal hitch comprising a bracket having a pair of laterally spaced forked ends, a transverse shaft extending between said forked ends, a sleeved bracket on said shaft, said bracket having longitudinally extending arms diverging therefrom, a pair of transversely disposed end plates, said arms pivotally engaging said plates, said plates being rigidly secured to a pair of longitudinally extending support members, said support members being spaced apart a distance slightly greater than the width of said forked bracket, shoulder means on said bracket extending laterally outwardly to abut one of said support members when said body is tilted laterally to one side or the other, corresponding ends of said support members being rigidly secured to a pair of inner links which extend transversely a distance beyond each of said support members, an outer link pivotally connected to each of said inner links at one end and pivotally connected at its other end to said front truck, said rear pivotal means comprising a pair of longitudinally spaced transversely extending U-shaped channel members, each of said pair comprising an upper and lower channel portion, said lower portion being rigidly fastened to said truck, said upper portion being rigidly fastened to said body extension, said upper and lower channels having common sides abutting along substantially their entire length, an intermediate connecting link positioned within said channels, said link being pivotally connected to the lower channel at one end and the upper channel member at the other end, corresponding ends of said front and rear truck links having cooperating pivotal positions, whereby said body may be tilted sidewardly in either lateral direction, to discharge its load.

8. A trailer comprising a front and rear axle, each of said axles mounted on wheel means, a truck mounted on each of said axles, each of said trucks extending fore and aft a distance greater than the width of its associated wheel means, a frameless laterally tilting body extending between said trucks, a draw bar fastened to the front of said body, said draw bar connected to a universal hitch at its forward end, said universal hitch pivotally connected to transversely extending link means, said link means pivotally connected to said front truck, an extension on the rear portion of said body, spaced transverse links between said rear truck and said extension, said last-named links being pivotally connected at one end to said rear truck and at their other end to said extension, said link means and spaced transverse links cooperating to direct tilting of said body sidewardly in either lateral direction.

9. A trailer comprising a front and rear axle, each of said axles mounted on wheel means, a truck mounted on each of said axles, a frameless laterally tilting body extending between said trucks, a draw bar fastened to the front of said body, said draw bar connected to a universal hitch at its forward end, said universal hitch pivotally connected to transversely extending link means, said link means being pivotally connected to said front truck, an extension member on the rear portion of said body, a pair of spaced transverse links between the rear truck and said extension, U-shaped channels forming brackets on said rear truck and said extension, said links being pivotally connected at one end to said rear truck and at their other end to said extension member, said brackets having complementary side walls completely enclosing said links when said body is in a non-dumping position, said link means and spaced transverse links cooperating to direct tilting of said body sidewardly in either lateral direction.

10. A trailer comprising a front and rear axle, each of said axles mounted on wheel means, a truck mounted on each of said axles, a frameless laterally tilting body extending between said trucks, a draw bar fastened to the front of said body, said draw bar connected to a universal hitch at its forwardmost end, said universal hitch comprising a pair of associated brackets, one of said brackets having transversely extending arms, the other bracket having longitudinally extending arms, both of said brackets having a common pivotal shaft, said universal hitch being pivotally connected to a pair of spaced transversely extending inner links, an outer link pivotally connected to each of said inner links at one end and pivotally connected at its other end to said front truck, an extension on the rear portion of said body, spaced transverse links between the rear truck and said extension, said last named links being pivotally connected at one end to said rear truck and at their other end to said extension, said links cooperating to direct tilting of said body sidewardly in either lateral direction.

11. A trailer comprising a front and rear axle, each of said axles mounted on wheel means, a truck mounted on each of said axles, each of said trucks extending fore and aft a distance greater than the width of its associated wheel means, a frameless laterally tilting body extending between said trucks, a draw bar fastened to the front of said body, said draw bar being connected to a universal hitch at its forward end, said universal hitch comprising a pair of associated brackets, one of said brackets having transversely extending arms, the other bracket having longitudinally extending arms, both of said brackets having a common pivotal shaft, said universal hitch being pivotally connected to a pair of spaced transversely extending inner links, an outer link being pivotally connected to each of said inner links at one end and pivotally connected at its other end to said front truck, an extension member on the rear portion of said body, a pair of spaced transverse links between the rear truck and said extension member, U-shaped channels forming brackets on said rear truck and said extension member, said last named links being pivotally connected at one end to said rear truck and at their other end to said extension member, said brackets having complementary side walls completely enclosing said transverse links when said body is in a non-dumping position, said links cooperating to direct tilting of said body sidewardly in either lateral direction.

References Cited in the file of this patent

UNITED STATES PATENTS

| 1,489,688 | Astrom | Apr. 8, 1924 |
| 1,652,262 | Walter | Dec. 13, 1927 |
| 1,933,689 | Wirz | Nov. 7, 1933 |
| 2,362,262 | French | Nov. 7, 1944 |
| 2,513,552 | Dove | July 4, 1950 |